United States Patent [19]

Avidor et al.

[11] 4,196,401
[45] Apr. 1, 1980

[54] METHOD AND APPARATUS FOR INJECTING GAS INTO A LASER CAVITY

[75] Inventors: Joel M. Avidor, Rehovot, Israel; Charles J. Knight, Cambridge, Mass.

[73] Assignee: The United States of America as represented by the Secretary of the Navy, Washington, D.C.

[21] Appl. No.: 896,946

[22] Filed: Apr. 17, 1978

[51] Int. Cl.$^2$ ............................................. H01S 3/00
[52] U.S. Cl. ........................... 331/94.5 G; 331/94.5 D
[58] Field of Search ...................... 331/94.5 D, 94.5 G

[56] References Cited

U.S. PATENT DOCUMENTS

| | | | |
|---|---|---|---|
| 3,842,363 | 10/1974 | Dobrzelecki et al. | 331/94.5 G |
| 4,011,522 | 3/1977 | Falk | 331/94.5 G |
| 4,021,753 | 5/1977 | Braunschweig | 331/94.5 D |
| 4,091,133 | 5/1978 | Papayoanou | 331/94.5 D X |

OTHER PUBLICATIONS

J. M. Avidor et al., "Experimental and Theoretical Investigation of Flow Generated by an Array of Porous Tubes", *AIAA Journal*, vol. 14, No. 11, Nov. 1976, pp. 1534–1540.

*Primary Examiner*—James W. Davie
*Attorney, Agent, or Firm*—Richard S. Sciascia; Paul N. Critchlow

[57] ABSTRACT

Laser gas injected into a multiple-pulsed electric discharge laser (EDL) must be removed as quickly as possible following each laser pulse. This 'clearing time' can limit the average laser output power. Fast, efficient mass transport is needed and it, in turn, requires the establishment of a uniform velocity flowfield. Such a uniform flowfield can be established by injecting the laser gas through arrays of porous tubes formed with eccentric walls tailored in wall thickness to introduce a non-uniform injection velocity around the circumference of each tube. Preferably, the tubes have a cross-sectional shape formed of displaced circular inner and outer contours to provide a progressively thickening wall. Tailoring is designed to establish an optimum, non-uniform injection velocity distribution capable of producing a nearly irrotational flow that rapidly develops into a uniform flowfield downstream of the tube array. Because of the enhanced heat transfer characteristics of the porous tubes, a beneficially uniform gas temperature also is maintained to assure good optical medium homogeneity.

7 Claims, 4 Drawing Figures

METHOD AND APPARATUS FOR INJECTING GAS INTO A LASER CAVITY

BACKGROUND OF THE INVENTION

The present invention relates to high power multiple-pulsed electric discharge gas lasers and, in particular, to means for injecting gas into the lasing regions.

The output power of multiple-pulsed lasers is derived by injecting a laser gas into the lasing cavity and applying an electric field to produce an output pulse. Gas is injected for each pulse and, between pulses, the processed gas is removed from the lasing region. Such systems are capable of generating considerable average output power which depends to a large extent upon the per pulse output energy of the device. However, average output power also is a function of the 'clearing time' or, in other words, the time required between pulses to remove the processed gas. For such a laser to achieve maximum efficiency, it is highly important to provide a fast, efficient mass transport of the injected gas medium. Transport efficiency and speed, in turn, requires the establishment in the laser cavity of a uniform flowfield as quickly as possible following the gas injection. As will be described, prior art systems have certain inherent velocity defects which lengthen 'clearing times' and unnecessarily limit the average output power.

Another concern involves the presence of density non-uniformities in the laser gas and the fact that they can seriously degrade its optical homogeneity. Such non-uniformity can have a variety of causes, one of which again involves the degree of uniformity in the established flow field of the injected gas. For example, velocity defects in the flowfield can produce density variations. Density variations due to temperature non-uniformities also are somewhat dependent upon the manner in which the gas is injected. Thus, in a so-called spray bar system consisting of a hollow tube formed with many small supersonic jet injection orifices, large temperature variations are created and the resulting optical medium homogeneity is very poor. A prior art porous tube injection system has provided significant improvement.

Fast, efficient mass transport has been the subject of a number of studies and, in fact, it has been successfully achieved in certain gas glow configurations. One example is a rather common configuration in which the flow is transverse both to the optical axis of the laser and its applied electric field. An AIAA paper 75-849 "Optimization of Sonic Jet Array Flow for Subsonic Electric Laser Medium Homogeneity" by J. P. Reilly, J. M. Avidor, R. M. Feinberg, and G. A. Theophanis, analyzes this configuration and, as stated, provides a successful resolution.

The present invention is directed primarily to another configuration in which the gas flow is parallel to the electric field rather than transverse. Further, it is principally concerned with an annular-type laser in which the E-beam is centered in the annulus and the electric field as well as the injected gas flow are parallel one to the other radially of the annular lasing region. With regard to this particular configuration, it, too, has received considerable study as reported in another AIAA paper 76-59, AIAA Journal Vol. 14, No. 11 (1534–1539) "Experimental and Theoretical Investigation of Flow Generated by an Array of Porous Tubes", J. M. Avidor, N. H. Kemp and C. J. Knight. Its particular contribution, as indicated by its title, is the use of an array or grid of porous tubes disposed in the laser cavity concentrically around the usual cylinder of the E-beam foil. However, as described in the paper, these porous tubes are concentric in form. In other words, their tube walls are of a uniform thickness and, because of this uniform thickness, the flowfield in the lasing region exhibits a significant velocity defect. The defect is due to the fact that the uniform wall thickness produces a uniform injection velocity around the circumference of the porous tubes. This uniform injection velocity, in turn, produces a flowfield that is strongly wake-like downstream of the tube array. Consequently, the clearing time in the region of the wake is substantially longer. Increased flowfield uniformity capable of minimizing the wake defects obviously would result in a faster, more efficient mass transport.

The present invention seeks primarily to minimize or avoid the wake defects of these concentric porous tube arrays. As will be described, this object is achieved by tailoring the tubes to produce a non-uniform injection velocity around their circumferences. In particular, eccentric tubes are used in which the tube thickness is tailored to give a specified surface velocity distribution that results in a rapid development of a uniform flowfield downstream of the array. Wake defects are significantly reduced. Additionally, due to the enhanced heat transfer characteristics of the porous tubes, a uniform gas temperature is maintained resulting in an excellent optical medium homogeneity.

BRIEF DESCRIPTION OF THE DRAWINGS

The invention is illustrated in the accompanying drawings of which.

DETAILED DESCRIPTION

The principles of the invention primarily are applicable to multi-pulsed, electric discharge lasers in which lasing gas is introduced into its lasing cavity or region for each output pulse. Between pulses the processed gas or, in other words, the gas that has been excited to produce the output pulse, is evacuated or drawn out of the laser region by any suitable reduced pressure arrangement. As has been indicated, the present system is particularly concerned with annular lasers of large axial length in which the E-beam source is located centrally of the laser annulus and the electric energizing field is applied radially of the annular lasing region. However, other laser configurations are contemplated at least to the extent that the present principles advantageously can be applied.

Figure 1:
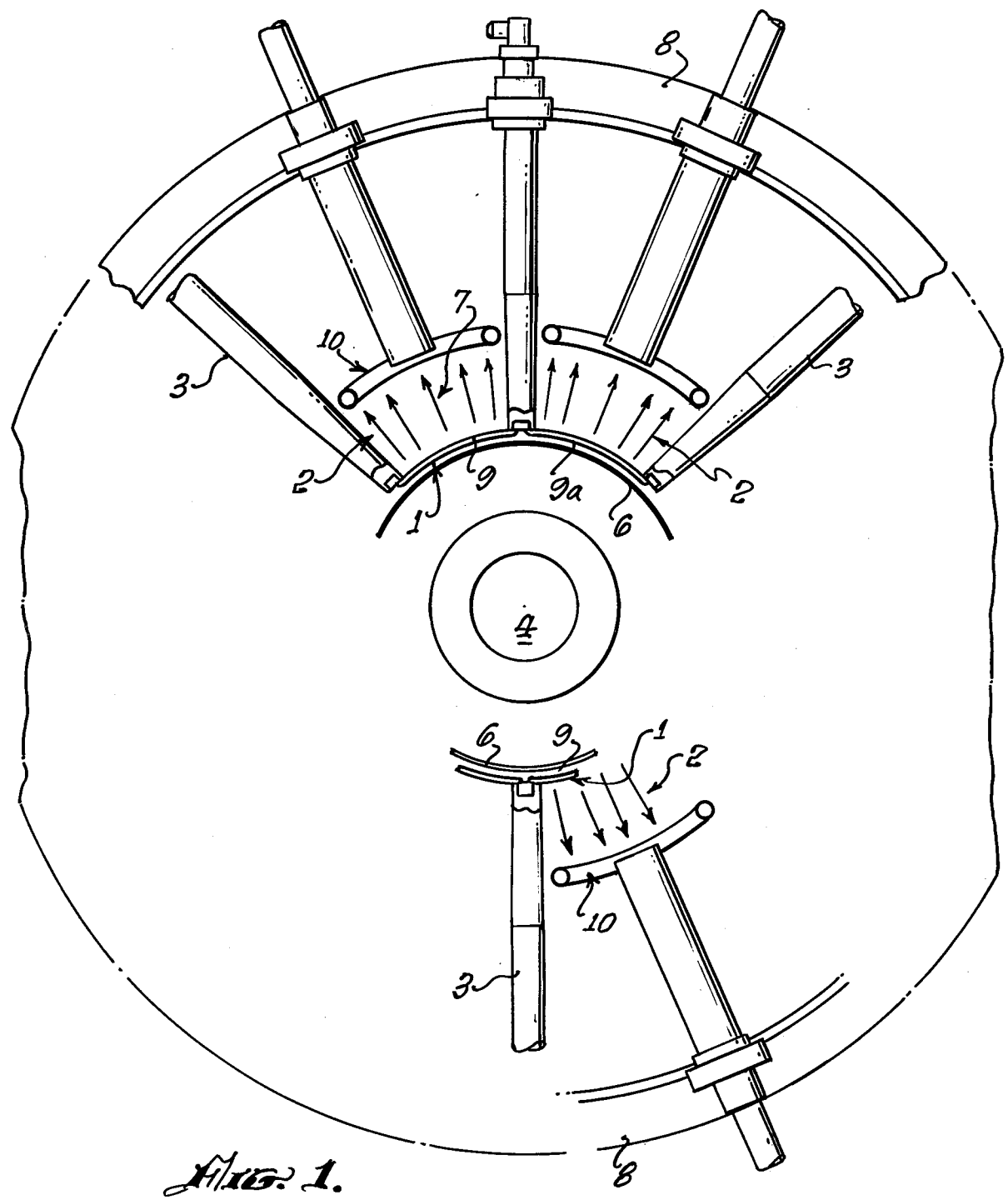
FIG. 1 is schematically illustrates the general arrangement of gas injection tube structure which includes the present porous tube array.

FIG. 1 illustrates the preferred annular arrangement or configuration. Lasing gas, which can be of any type, is injected through an array of spray tubes 1 into a lasing region or cavity 2. The gas is supplied from a pressurized plenum source (not shown) through header tubes 3 to the injection tubes which, for reasons to be discussed, are porous tubes which permit the gas to escape at a fixed injection velocity in the form of small, subsonic jets. Gas excitation is achieved by an electric field derived from an E-beam 4 the energy of which is applied to a conventional cylindrical foil member 6. The field itself, as designated by arrows 7, is directed radially of lasing region 2 which, for descriptive purposes, can be considered as the area between anodes 10 and foil 6. Cathodes normally would be present near foil 6. An outer wall 8 supports the anodes and encloses the lasing cavity.

Laser region 2, as well as the area betwen anodes 7 and outer wall member 8, generally are annular in form and of considerable axial length. The spray tube arrays, as will be understood, extend the axial length of the lasing region. To achieve this purpose, the arrays are formed of a plurality of individual, axially-spaced spray tubes each of which is identified by numeral 9. Also, the arrays are circular in that they extend circumferentially around the laser annulus at a spaced radial distance from foil 6. Preferably, however, the circle of the arrays is formed by a plurality of separate segments each of which covers a certain arc of the annulus. The segmented arrangement reduces the axial length of each tube sufficiently to avoid pressure variations axially of the tubes. As shown, two header tubes 3 are provided for each segment of the arrays. Initially this arrangement was used so that gas could be supplied to each end of the individual tubes. However, this option has been found unnecessary and, in practice, one of the header tubes is used for supply and the other as a dead-end connection.

The operation of the FIG. 1 device has been generally described. Lasing gas is admitted through porous tube array 1 into laser region 2 where it is energized to produce an output pulse. Subsequent to the generation of the pulse the processed gas is drawn out of region 2 to permit another supply to be injected for another pulse. The time between the pulses is a so-called 'clearing' time which, as will be appreciated, may be relatively long or short depending upon the time required for the gas flow into and out of the lasing region. Accordingly, in these pulsed EDL lasers, the average output power of the laser depends not only upon the per pulse energy out of the system but also on the clearing time. It, therefore, is highly important to achieve a fast and efficient mass transport which reduces the clearing time and increases the permissable pulse rate and the average output power of the laser itself.

Fast, efficient mass transport itself is largely dependent upon the nature of the flowfield established downstream of the injected gas. For example, non-uniform flowfields in which there are substantial velocity variations either axially or circumferentially of the lasing region result in substantially longer clearing times. The reason is that, although the gas injection velocity can be controlled, if the downstream flow is uneven the time interval for the mass transport must accomodate the lower flowfield velocities. Uniformity also contemplates establishment as quickly as possible after injection or, in other words, in the nearfield region close to the porous spray tubes. Thus, the present emphasis is in the nearfield flow region which is strongly dependent on such parameters as the porous tube gas injection characteristics, tube spacing and, possibly, other structural effects such as back wall positions. At this point, it also can be noted that uniformity has effects other than those involving clearing times. Thus, it is beneficial in assuring a good optical homogeneity in the lasing medium.

The use of porous tube arrays substantially improves the uniformity of the flowfield as well as the optical homogeneity. However, as already noted, such porous arrays have been the subject of a previously-identified study titled "Expermental and Theoretical Investigation of Flow Generated by an Array of Porous Tubes". This study, in a number of regards, is comparable to the present laser arrangement. Thus, it is concerned primarily with similar porous arrays arranged in the same manner circumferentially around an E-beam foil of a multiple-pulsed electric discharge laser. The gas flow also is radial of an annular lasing region and parallel to the direction of the applied electric field. The results achieved clearly demonstrate that such porous-like arrays provide significantly greater uniformity in the flowfields. In the study flowfield characteristics are exhaustively analyzed and considerable data is generated relative to both design details and operation.

Figure 3:
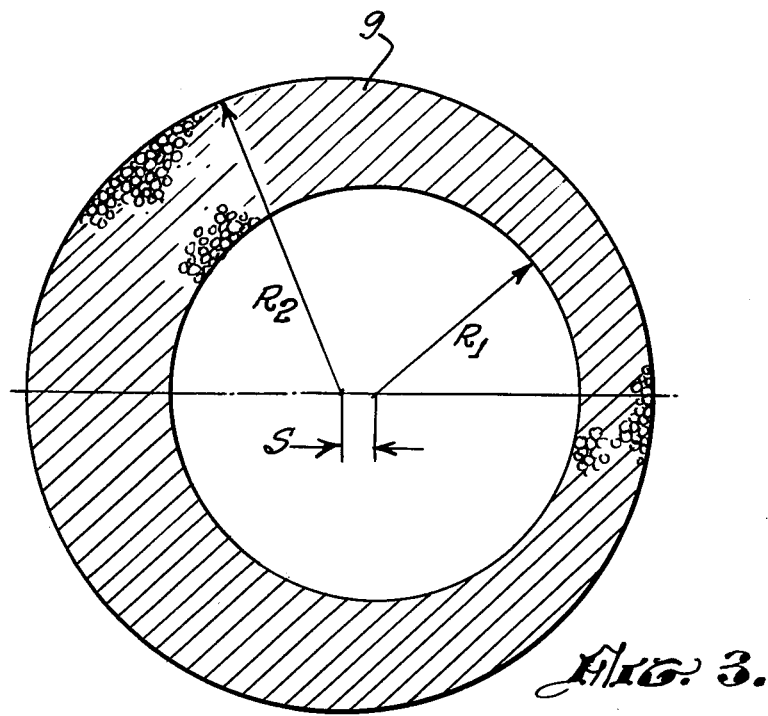
FIG. 3 is a cross section of one of the present gas injection tubes showing a preferred eccentric tube wall contour.

The significant difference between this study and the present invention is that the study proposes the use of concentric porous tubes while the present invention uses eccentric tubes such as the tube shown in FIG. 3. The term 'concentric' means that each tube wall is of uniform thickness. The term 'eccentric' means that the wall progressively increases in thickness circumferentially of the tube. The problem with concentricity is that it produces a strongly wake-like velocity downstream of the porous tube array. Consequently, the clearing time in the region of this velocity defect is substantially longer than if the stream were substantially uniform. The eccentricity largely avoids this velocity defect provided it is tailored to produce a specific non-uniform injection velocity distribution around the circumference of each tube.

Figure 2:
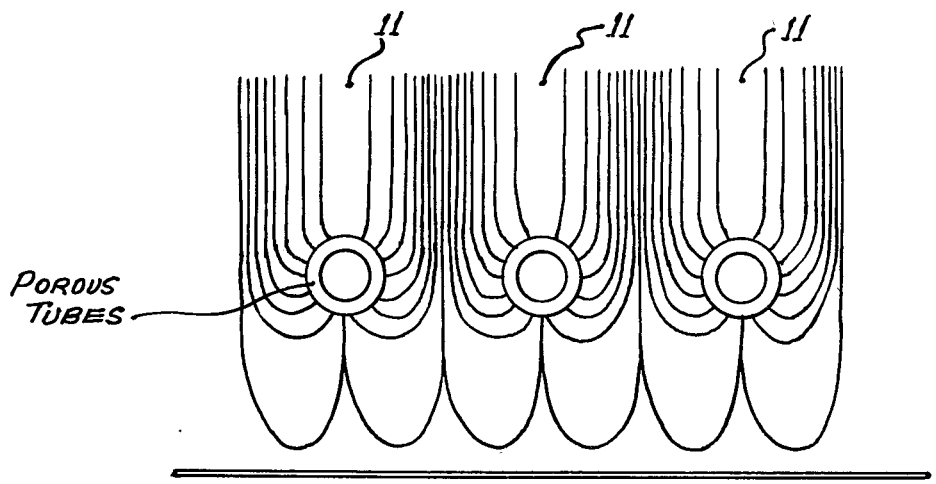
FIG. 2 is a 'Prior Art' figure used to demonstrate a certain velocity defect in the previously-described concentric tube arrangement.

The velocity defect of the concentric tubes can be better understood with reference to FIG. 2 which shows the resulting flow pattern. First, however, it is to be noted that when, as is the case, the pressure drop across the tube wall is large compared to its dynamic pressure, the streamlines, as shown in FIG. 2, must issue normal to the tube. Thus, the injection streamline directions are of a diverging nature and, if the injection velocity is the same for each streamline, the streamlines tend to conglomerate near the centerline between tubes where they must turn by symmetry. Of course, as also indicated in FIG. 2, the injected streams each are drawn by the reduced pressure in the laser cavity so that they bend into a direction that is radial to the cavity and parallel to its electric field. However, since the velocity between a streamline pair is in inverse proportion to the spacing between the pair and streamlines tend to conglomerate near the centerline between tubes, the resulting pattern must be vortical. The vortical flow produces wakes above each tube which are identified in FIG. 2 by numeral 11.

To increase uniformity it is important to avoid, as much as possible, such a wake-like behavior and this is possible only if the flow is irrotational rather than vortical. Irrotational flow, however, can be produced only if the injection velocity distribution circumferentially of the tube is non-uniform. In this regard, it again should be noted that, regardless of the uniformity or non-uniformity of the injection velocity, the streamlines always must issue normal to the outer wall of the tube. This constraint is imposed by the large pressure drop imposed by the porous walls. The irrotational flow results because of progressive variations in the velocity components circumferentially of the tube. If the tube is mounted with its thicker wall faced inwardly or in closest proximity to foil 6, the injection speed is lower in this thicker portion so that when the streamlines conglomerate near the centerline between tubes, it can be arranged that the velocity there is comparable to the velocity over the tube centers. If a certain ideal injection velocity distribution is used, the resulting flowfield will be irrotational.

The actual eccentricity or thickness distribution of the tubes should be designed to produce as nearly as possible the ideal normal velocity distribution or, in other terms, to produce a non-uniform velocity distribution that is tailored to achieve flowfield uniformity in the nearfield region of the tubes. Determination of the ideal distribution theoretically is straightforward. It is necessary only to solve Laplace's equation subject to the no-slip condition on the tubes and also subject to a specific total inflow. For example, the ideal normal velocity distributions for three different tube spacings have been derived based upon the use of a typical tube of a particualr O.D. and a specified spacing, outside radius, and average normal velocity. Similarly computations can be made for any particular spacing or tube and it then is a relatively simple matter to design the thickness distribution of the tube so that it matches or provides the ideal normal velocity distribution. However, although achievable, the required thickness distribution may not be practical from a manufacturing point of view. A more practical solution is to use tubes having a cross-section of eccentric circular inner and outer contours. Referring to FIG. 3, the circular contours are defined by radii $R_1$ and $R_2$ while the eccentricity is provided by center spacing S. Using these parameters it is straightforward to solve the compressible flow equations inside the porous medium and determine the resulting velocity distribution at the outer surface produced by the particular eccentric circular tube. A comparison of such velocity distribution for any particular values has been made with the ideal normal velocity. Although the agreement is not perfect, there clearly is a significant improvement in the velocity defects which, as stated, are inherent in the concentric tubes arrangements.

The eccentric porous tubes used in this study were manufactured by Mott Metallurgical, Farmington, Conn. with an 0.5$\mu$ filtration rating. Average tube dimensions were 0.64 cm I.D., 0.95 cm O.D., 36 cm length and 0.11 cm minimum wall thickness. The flowfield around such a single isolated eccentric porous was studied by using a constant temperature hot wire anemometer system (Thermo Systems, Inc.) These distributions were obtained with the hot wire probe located at 0.32 cm from the tube surface. Resulting plots show that, while there are large variations in the velocity field, which can be attributed to small scale non-uniformities of the porous material coupled with jet coalescence effects, the axial average remains quite constant along the whole length of the tube.

Other observations have been made using an array consisting of 9 eccentric porous tubes confined in a 5-sided plexiglass box. The tubes were connected to two large diameter pipes serving as the plenum for high pressure $N_2$ gas. The spacing between tube centers and the distance from the cube centers to the bottom plate of the box both were 2.5 cm. The thick wall of each tube was faced towards the bottom plate. A constant temperature hot wire anemometer system was used in conjunction with a true RMS meter to study the mean velocity and RMS velocity fluctuations in the flowfield generated by the tube array.

Figure 4:
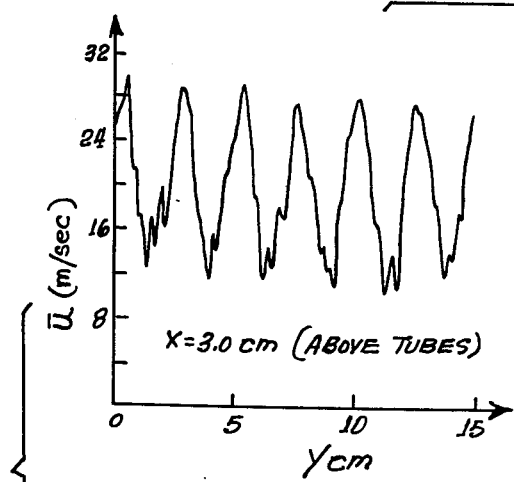
FIG. 4 is a series of plots illustrating the manner in which a uniform flowfield is developed at progressively increasing distances downstream of the present gas injection array.
Figure 4:
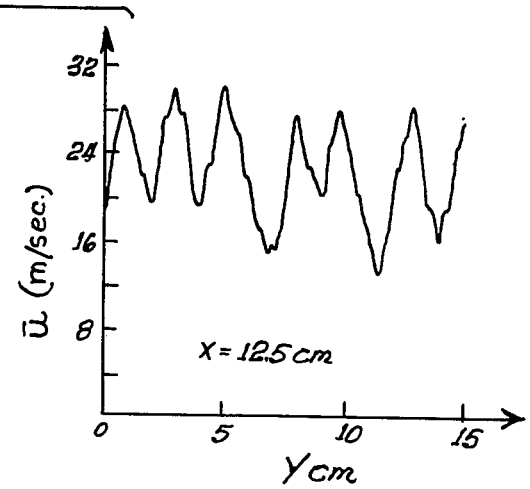
Figure 4:
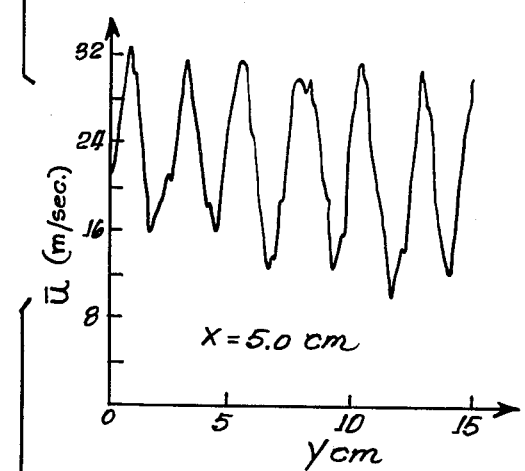
Figure 4:
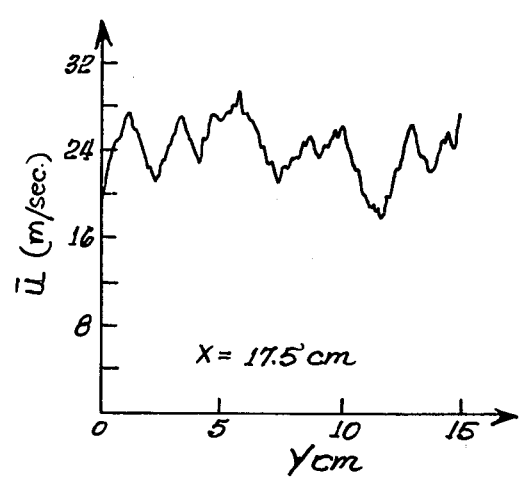
Figure 4:
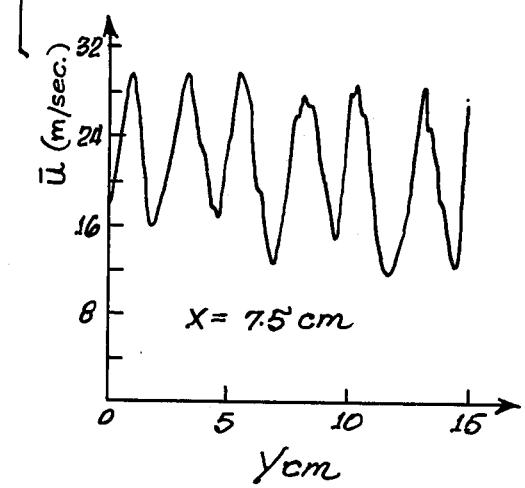
Figure 4:
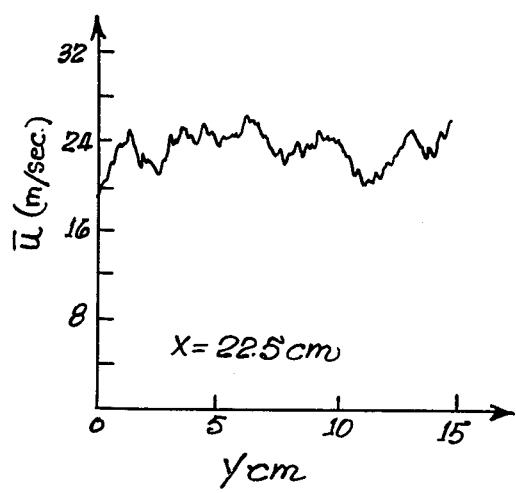

FIG. 4 shows the distribution of mean velocity ($\bar{u}$) at various locations downstream of such a grid. In general, the flowfield does show some wake-like behavior with a decrease in mean velocity over each porous tube. Small variations do occur between different wakes, presumably caused by the non-uniformities in the porous material. However, a comparison of the data reported for the concentric tubes clearly shows that the present mean velocity defect is substantially smaller than the defect of the concentric tube flowfield.

It is appreciated that this data is applicable to a tube array using a particular tube size, eccentricity, spacing and pressure. Similar data, however, is readily obtained for other arrangements and there should be no difficulty in optimizing the parameters for any particular situation. In fact, optimization can be achieved experimentally as well as theoretically. Thus, for any desired tube size and eccentricity, the optimum spacing can be found and vice versa. The porous nature of the tubes also can be varied although it should be such that there is a large radial pressure drop through the tube wall so that the radial mass injection rate is uniform along the tube length. As indicated, very low porosity tubes are used, such as the described tubes having a 0.5$\mu$ filtration rating. With such a rating, for example, a pressure differential of 150 psi produces about a 7 m/sc mean radial velocity at the outer tube surface of a concentric tube. Pressures, of course, will vary according to other parameters although, as indicated, low porosity is desired to achieve the large pressure drop.

In general, it has been found that the present eccentric circular tubes largely avoid the wake-like behavior exhibited by an array of concentric porous tubes. The downstream flowfield has greater uniformity resulting in a significantly reduced clearing time which, as described, improves the average output power of the laser. Best results, of course, are obtained by matching the thickness distribution to the ideal normal velocity distribution. However, the eccentric circular contours achieve significant improvements and provide a more practical solution. Another important advantage is that, due to the enhanced heat transfer characteristics of the porous tubes, a very uniform gas temperature is maintained. The uniformity of temperature and flow establish a optically homogeneous flowfield which avoids density variations and assures good optical quality.

Obviously many modifications and variations of the present invention are possible and within the scope of the appended claims the invention may be practiced otherwise than as specifically described.

We claim:
1. A method of injecting gas into an annular gas laser of a type having a gas flow field directed radially of its annular lasing cavity comprising:
   applying the gas axially to porous tubes at a pressure sufficient to produce subsonic injection gas jets directed normal to the tube walls throughout their exterior circumferential surface area,
   said tubes each being formed to produce jet injection velocities having a non-uniform velocity distribution circumferentially of the tube, said distribution being such that the differing jet velocity compo- nents tend to provide an irrotational flow as the jets move into said radial flowfield, said irrotational flow providing a uniform flowfield in close proximity to said tubes.

2. Apparatus for injecting a laser gas into an axially-elongate annular laser cavity for establishing a substantially uniform flowfield directed radially of its annulus and parallel to its applied energy field comprising:

an array of porous tubes disposed circumferentially around said annular cavity in proximity to its radially-inward wall and in an axially-parallel spaced-relationship one with the other, and header means for supplying pressurized laser gas to said tubes, said tubes each having its tube walls formed of a low porosity material capable of injecting its pressurized gas supply into said cavity radially at a controlled injection velocity rate; said walls further being eccentric in form in that their circumferential extent increases from a relatively thin cross-section to a thicker one with said thicker wall portion being disposed nearest to said inner wall of the cavity, said eccentricity being tailored for producing a non-uniform normally-directed injection velocity distribution circumferentially of each tube whereby said injection velocity components can conglomerate in the nearfield region of said array to provide said substantially uniform radially-directed flowfield.

3. The apparatus of claim 2 wherein said eccentric increases in the wall thickness of each tube is provided by forming the tube with eccentrically displaced circular inner and outer diameter contours.

4. The apparatus of claim 3 wherein the filtration factor porosity of each provides a pressure drop across its walls of sufficient magnitude to produce said normally-directed injection velocity components.

5. The apparatus of claim 2 wherein the porosity of each tube is of about an 0.5 filtration factor.

6. The apparatus of claim 2 wherein said array of tubes extends circumferentially about said annular laser cavity and said axially spacing of the tubes in the array is a fixed distance determined by the dimensions and porosity of the tubes as well as their supply pressure.

7. The apparatus of claim 6 wherein said circular array is formed of a plurality of separate segments each covering an arcuate extent of the circle, said separate segments each being provided with individual header means.

* * * * *